April 3, 1934.   J. S. PARSONS   1,953,127
BACK-UP PROTECTIVE APPARATUS FOR NETWORK PROTECTORS
Filed Jan. 14, 1933
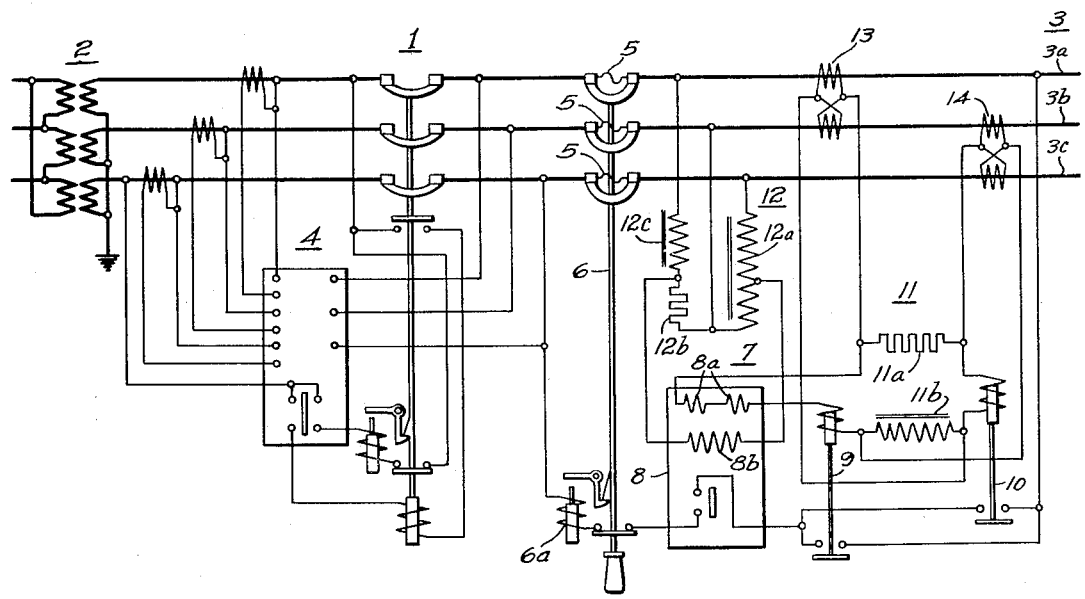
WITNESSES:
E. J. Weller.
Geo. O. Harrison.
INVENTOR
John S. Parsons.
BY
ATTORNEY Patented Apr. 3, 1934

1,953,127

UNITED STATES PATENT OFFICE 1,953,127

BACK-UP PROTECTIVE APPARATUS FOR NETWORK PROTECTORS

John S. Parsons, Swissvale, Pa., assignor to Westinghouse Electric & Manufacturing Company, East Pittsburgh, Pa., a corporation of Pennsylvania Application January 14, 1933, Serial No. 651,690

6 Claims. (Cl. 175—294)

My invention relates to protective apparatus for electrical circuits and particularly to protective units of the class in which circuit breakers and relays are provided for protection under abnormal electrical conditions, and fuses are provided for ultimate protection in the event of a mechanical failure of the circuit breaker or relays.

Although not limited thereto, my invention is particularly applicable to network protectors for use in alternating current network distribution systems. In such protectors, a power directional relay is commonly provided for operating a shunt trip coil of the protector circuit breaker upon the occurrence of a reverse power flow of predetermined value through the protector. In order to insure interruption of the network transformer secondary circuit under fault conditions in the event that a mechanical defect or open circuit in the protector prevents the proper operation of the relay or circuit breaker, it is the usual practice to provide fuses for back-up protection.

The fuses commonly used are of copper or zinc and are of sufficiently low rating to protect the associated transformer bank against destructive fault currents. The $i^2r$ losses in these fuses during normal heavy load condition are so high that the metal parts of the protector unit must be made of somewhat larger size than necessary for interrupting capacity alone, in order to dissipate the fuse losses without excessive temperature rise.

It is an object of my invention to provide a novel back-up protective device for network protectors and similar apparatus which shall provide fuse protection under fault condition in the event that the protector circuit breaker fails to open but in which the fuse losses during normal conditions, shall be reduced or eliminated.

A further object of my invention is to provide a novel back-up protective device having fuses, in which means shall be provided for short-circuiting the fuses under normal conditions and for removing the short circuits under fault conditions, if the protector circuit breaker fails to open.

Other objects of my invention will become evident from the following detailed description taken in conjunction with the accompanying drawing, in which the single figure is a diagrammatic view of a network protector embodying my invention.

Referring to the drawing in detail, the main circuit breaker 1 of the network protector is interposed between the secondary windings of a bank of transformers 2 and a network load circuit 3 in the usual manner. The transformer bank 2 may be one of a number of banks connected between each of a plurality of feeders (not shown) and the load network.

The circuit breaker 1 is provided with suitable control apparatus, shown diagrammatically as a power directional relay 4, for causing the main circuit breaker 1 to open in response to a power flow of predetermined value from the network 3 to the transformer bank 2 and for causing the circuit breaker 1 to close when the secondary voltage of the transformer bank 2 exceeds the voltage of the network 3 and bears a predetermined phase relationship thereto. Although for simplicity the control apparatus for the main circuit breaker 1 is shown as a single relay 4, it will be understood that many elements not necessary for an understanding of my invention have for simplicity been omitted. This control apparatus may be of the automatic reclosing type, as shown for example in my copending application, Serial No. 627,083, filed July 30, 1932 and assigned to the Westinghouse Electric & Manufacturing Company, or may be of other automatic reclosing or manual reclosing types known in the art.

A set of fuses 5 of any suitable type and of a rating suitable for the proper protection of the transformer bank 2 is connected in the transformer secondary circuit, preferably between the main circuit breaker 1 and the network circuit 3.

An auxiliary circuit breaker 6, preferably of the manually reclosed shunt trip type is provided for short-circuiting the fuses 5 during normal conditions of power flow between the transformer bank 2 and the network circuit 3. As the auxiliary circuit breaker 6 merely shunts the load current around the fuses 5 and is not called upon to interrupt the load circuit, its parts may be comparatively small and light.

The auxiliary circuit breaker 6 is provided with a shunt trip coil 6a which is controlled by means of suitable fault responsive relay apparatus denoted generally by the reference numeral 7. In the preferred form of my invention, the relay apparatus 7 comprises a phase sequence power directional relay having a positive phase-sequence directional element 8, a positive phase-sequence overcurrent element 9 and a negative phase-sequence overcurrent element 10.

The power directional element 8 is of the single phase induction-disc type and is provided with a pair of current windings 8a connected to a current phase-sequence filter 11, and with a potential winding 8b connected to a positive phase-sequence voltage filter 12. The element 8 may be of usual induction disc construction except that the impedance phase angle of its potential winding 8b is 60° rather than an angle approaching 90° as in the usual single-phase relay. A certain amount of time delay is inherent in an induction disc element such as the power directional relay 4 or the directional element 8. The relay 4 and the directional element 8 are so designed that the time element of the former is less than that of the latter.

The current phase-sequence filter 11 is of the quadrilateral network or bridge type and is energized by means of two pairs of current transformers 13 and 14 having their secondary windings connected in opposition in order to eliminate zero phase sequence current components in a manner well understood in the art. The four branches of the quadrilateral network 11 include the coil of the negative phase sequence overcurrent element 10, a resistor 11a, the current windings 8a and the coil of the positive phase-sequence overcurrent element 9 in series, and a reactor 11b respectively. The impedance relationship of the elements included in the quadrilateral network is as follows: The impedance of the coil of the negative phase sequence over-current element 10 is equal in magnitude and phase angle to the impedance of the current windings 8a and the coil of the positive phase-sequence overcurrent element 9 in series. The impedance of the reactor 11b and the coil of the overcurrent element 10 in series is equal in magnitude to the impedance of the current windings 8a, the coil of the overcurrent element 9 and the resistor 11a in series, but rotated 60° in the lagging direction from the phase angle of the latter impedance.

The positive phase-sequence voltage filter 12 comprises an autotransformer 12a having a 40% tap, a resistor 12b and a reactor 12c. The constants of the resistor 12b and reactor 12c are so related that the voltage drop across the resistor 12b is equal to 40% of the total voltage impressed on the reactor 12c and resistor 12b in series but lags the latter voltage by a phase angle of 60°.

Assuming that the filters 11 and 12 are energized from the phases of the network circuit 3 in the order indicated by the subscripts a, b and c of the network conductors 3a, 3b and 3c, it may be shown that under conditions of polyphase power flow in the network circuit 3, the power directional element 8 is energized in accordance with the positive symmetrical component of power flow in the network circuit 3, and the overcurrent elements 9 and 10 are energized in accordance with the positive and negative symmetrical components of current respectively in the network circuit 3.

The current and voltage windings 8a and 8b of the directional element 8 are connected in such relative directions that the contact members of the element 8 close in response to flow of a positive phase-sequence power from the network circuit 3 to the transformer bank 2. The overcurrent elements 9 and 10, respectively, are designed to close at positive and negative phase sequence current values of the order of 20% to 80% of the rated full load current of the transformer bank 2.

The operation of the above-described apparatus may be set forth as follows: It is assumed that the circuit breakers 1 and 6 are initially closed, the various relays are in the positions shown in the figure, the transformer bank 2 is energized by polyphase voltage of normal value and that power is flowing in the normal direction from the transformer bank 2 to the network 3.

If a fault occurs on the network 3, the circuit breakers 1 and 6 remain closed and the fault is burned clear in the usual manner.

If a fault occurs in the feeder to the left of the transformer bank 2, the direction of flow of total power and also of the positive symmetrical component of total power reverse as is well known, and these power quantities flow from the network 3 through the transformer bank 2 to the fault.

The positive symmetrical components of current flow now rises to fault values considerably higher than the rated full load current of the transformer bank 2. If the fault is of unsymmetrical character, the negative symmetrical components of current flow also rise to fault values. However, because of the impedance of the transformer bank 2 and the comparatively large power capacity of the network 3, the voltage available at the protector remains at a comparatively high percentage of normal value.

In response to the reversal flow of total power, the power directional relay 4 operates with comparatively short time delay to trip open the main circuit breaker 1. At the same time one or both of the overcurrent elements 9 and 10 close in response to overcurrent conditions at the time of the fault. The power directional element 8, however, because of its comparatively long time delay does not immediately close. If for any reason, the main circuit breaker 1 fails to open, the power directional element 8 closes to complete a circuit for the trip coil 6a of the auxiliary circuit breaker 6. The auxiliary circuit breaker 6 now trips open to insert the fuses 5 in the secondary circuit of the transformer bank 1, and one or more of the fuses blow to protect the transformer bank.

Assuming that only the main circuit breaker 1 has opened, as would ordinarily be the case, this circuit breaker is automatically reclosed in a manner well understood in the art when feeder voltage is restored and bears a predetermined relationship of magnitude and phase position to the network voltage.

In the event of opening of the auxiliary circuit breaker 6, one or more of the fuses 5 in practically all cases blows to interrupt the flow of power to the fault. The blown fuse prevents the automatic reclosure of the main circuit breaker 1, thereby necessitating an inspection trip to replace the fuses and manually reclose the auxiliary circuit breaker 6.

As the fuses 5 are never operatively connected in the main power circuit during normal conditions, the $i^2 r$ losses in these fuses are eliminated. The heat losses to be dissipated by the protector are accordingly greatly reduced, and the protector may be compactly and economically designed with a minimum size of metal parts.

I do not intend that the present invention shall be restricted to the specific structural details, arrangement of parts or circuit connections herein set forth as various modifications thereof may be effected without departing from the spirit and scope of my invention. I desire therefore that only such limitations shall be imposed as are indicated in the appended claims.

I claim as my invention:

1. In a protective unit for an electric power circuit, a main circuit breaker in said circuit, control means for said circuit breaker including fault responsive means for controlling the opening thereof, a fuse in said circuit, means for establishing a short circuit around said fuse during normal conditions of said power circuit and means for causing said short-circuit to be opened in response to an abnormal electrical condition of said power circuit, whereby the $i^2r$ losses of said fuse are eliminated during normal conditions of said power circuit and said fuse is rendered available for back-up protection of said power circuit during an abnormal condition thereof.

2. In a protective unit for an electric power circuit, a main circuit breaker in said circuit, control means for said circuit breaker including fault responsive means for controlling the opening thereof, a fuse in said circuit, means for establishing a short circuit around said fuse during normal conditions of said power circuit and means including a relay operable with time delay for causing said short-circuit to be opened at the expiration of an interval of time after the start of an abnormal condition of said circuit if said circuit breaker fails to open within said interval.

3. In a network protector for an electric power circuit, a main circuit breaker in said circuit, control means for said circuit breaker including fault responsive means for controlling the opening thereof, a fuse in said circuit, means for establishing a short-circuit around said fuse during normal conditions of said power circuit, and means including a power directional element for causing said short-circuit to be opened in response to predetermined abnormal conditions of said power circuit involving an abnormal directional power condition.

4. In a network protector for an electric power circuit, a main circuit breaker in said circuit, control means for said circuit breaker including fault responsive means for controlling the opening thereof, a fuse in said circuit, means for establishing a short-circuit around said fuse during normal conditions of said power circuit, and means including an overcurrent element for causing said short-circuit to be opened in response to predetermined abnormal conditions of said power circuit involving an over-current condition.

5. In a network protector for an electric power circuit, a main circuit breaker in said circuit, control means for said circuit breaker including fault responsive means for controlling the opening thereof, a fuse in said circuit, an auxiliary circuit breaker for short-circuiting said fuse during normal conditions of said power circuit, and means including a power directional element and an overcurrent element for causing said auxiliary circuit breaker to open in response to predetermined abnormal conditions of said power circuit involving an abnormal directional power condition and an overcurrent condition.

6. In a network protector for a polyphase alternating-current circuit, a main circuit breaker in said circuit, control means for said circuit breaker including fault responsive means for controlling the opening thereof, a set of fuses in said circuit, an auxiliary circuit breaker for short-circuiting said fuses during normal conditions of said circuit, and control means for causing said auxiliary circuit breaker to open at the expiration of a time interval in response to predetermined abnormal conditions of said circuit, said last-mentioned control means including an element responsive to a directional positive phase-sequence power condition of said circuit and operable with time delay, an element responsive to a positive phase-sequence current condition of said circuit and an element responsive to a negative phase-sequence current condition of said circuit.

JOHN S. PARSONS.